United States Patent [19]

Peter

[11] Patent Number: 5,353,823
[45] Date of Patent: Oct. 11, 1994

[54] DEVICE FOR CLEANING THE FASTENING SHANK OF A TOOL OR OF A TOOLHOLDER

[75] Inventor: Novak Peter, Tägerwilen, Switzerland

[73] Assignee: Starrfräs Maschinen AG, Rorschacherberg, Switzerland

[21] Appl. No.: 90,982

[22] Filed: Jul. 12, 1993

Related U.S. Application Data

[63] Continuation of Ser. No. 912,044, Jul. 9, 1992, abandoned, which is a continuation of Ser. No. 588,137, Sep. 26, 1990, abandoned.

[30] Foreign Application Priority Data

Sep. 29, 1989 [CH] Switzerland .................... 3557/89-0

[51] Int. Cl.⁵ .................... B08B 3/12; B08B 3/02
[52] U.S. Cl. .................... 134/186; 134/1; 134/180; 134/182
[58] Field of Search .................... 134/1, 184, 186, 144, 134/148, 153, 155, 180, 181, 182, 199, 149, 200, 111; 366/127; 15/94, 104.92, 423

[56] References Cited

U.S. PATENT DOCUMENTS

| | | | |
|---|---|---|---|
| 2,495,295 | 1/1950 | Spanier | 134/1 X |
| 2,814,575 | 11/1957 | Lange, Jr. | 366/127 X |
| 2,918,925 | 12/1959 | Dopler | 134/153 X |
| 2,994,330 | 8/1961 | Catlin et al. | 134/1 X |
| 3,024,138 | 3/1962 | Schlott | 134/1 |
| 3,503,805 | 3/1970 | Denyes | 366/127 X |
| 3,660,860 | 5/1972 | Dziuk | 366/127 X |
| 4,157,096 | 6/1979 | Miller, Jr. | 134/111 |
| 4,193,818 | 3/1980 | Young et al. | 134/184 X |
| 4,728,368 | 3/1988 | Pedziwiatr | 134/184 X |
| 4,786,352 | 11/1988 | Benzing | 134/1 X |

FOREIGN PATENT DOCUMENTS

| | | | |
|---|---|---|---|
| 2724888 | 12/1978 | Fed. Rep. of Germany | 15/423 |
| 363659 | 10/1938 | Italy | 134/153 |
| 74489 | 10/1916 | Switzerland | 134/199 |
| 790671 | 2/1958 | United Kingdom | 134/1 |

*Primary Examiner*—Philip R. Coe
*Attorney, Agent, or Firm*—Egli International

[57] ABSTRACT

The device comprises a cleaning chamber (1) which is arranged on a base (10) and through the orifice (13) of which the shank part (3) of a tool (5) or of a toolholder (4) is introduced. The wall of the cleaning chamber (1) is matched to the shape of the shank part (3) and has an internal thread (7). A compressed liquid is introduced through a run-in orifice (8), streams through the grooves of the internal thread (7) and flows virtually without pressure through a run-off orifice (9), at the same time discharging dirt particles located on the surface of the shank part (3). The shank part (3) can be clamped and consequently fixed in the cleaning chamber (1) by means of the clamping appliance (19). An increased cleaning effect is thereby achieved.

3 Claims, 2 Drawing Sheets

DEVICE FOR CLEANING THE FASTENING SHANK OF A TOOL OR OF A TOOLHOLDER

This is a continuation of copending application Ser. No. 07/912,044 filed on Jul. 9, 1992, now abandoned which is a continuation of application Ser. No. 07/588,137 filed on Sep. 26, 1990, now abandoned.

BACKGROUND OF THE INVENTION

1. Field of Invention

The invention relates to a device for cleaning the shank part of a tool or of a toolholder receiving a tool, wherein the shank part the tool or toolholder can be clamped in the machine spindle of a machine tool.

The mounting of a tool or of a toolholder for the tool in the machine spindle contributes substantially to the efficiency of machine tools and their machining accuracy. For this purpose, many tools and toolholders are equipped with a shank part which is designed as a conical or cylindrical shank and which can be clamped in a corresponding receptacle of the machine spindle. At the same time, when the tool or toolholder is being clamped in the machine spindle, it is necessary to guarantee the greatest possible cleanliness of the bearing faces of the shank part provided for the fastening.

2. Description of Relation Art

Various possible ways in which the bearing face of the shank part of the tool can be kept clean are known. In essence, the bearing face of the shank part is treated with a brush which is moved in rotation over the bearing face. If the shank part is a cone, such as is often used on tools, the brush must have a conical hollow shape.

On machine tools used in machining centres, there is usually a stock of a relatively large number of tools which are stored in a tool store, called up according to the particular machining program and inserted into the machine spindle by handling appliances. It is therefore generally insufficient to guarantee the cleanliness of the bearing faces of the shank part of the tools when the tool set is being put together. On the contrary, it must be remembered that the tools and toolholders stored in the tool store are exposed to an albeit only slight contamination which can impair the exact mounting of the shank part in the machine spindle when the tool is being clamped. It is expedient, therefore, to clean the shank part of a tool or holder before it is inserted into the tool spindle, thus not only guaranteeing a high production accuracy, but also thereby protecting the inner part of the machine-tool spindle from dirt particles and damage caused by chips caught in it. According to experience, the known devices only incompletely solve the problem of maintaining a high degree of cleanliness of the shank parts of the tools and holders. It is possible to guarantee the removal of larger dirt particles and chips, but not removal of smaller dirt particles which adhere to the greasy surface usually present on the bearing faces.

SUMMARY OF THE INVENTION

This is remedied by the invention which is based on the object of further designing a device of the type described in the introduction, in such a way that an enhanced cleanliness of the bearing faces of the shank parts of the tools and holders is obtained, whilst the cleaning can be carried out both in the tool stock and on the machine tool shortly before the tool or holder is inserted into the machine spindle.

According to the invention, this object is achieved in that for treating the shank part of the tool or the toolholder a cleaning chamber is provided, which is equipped with a run-in and a run-off, the run-in and the run-off being arranged in one of the walls of the housing of the cleaning chamber and being designed for a liquid and/or gas inflow or flow-off through the cleaning chamber. Because a special cleaning chamber is provided, the highest possible requirements for the cleanliness of the bearing faces of the shank part are satisfied.

BRIEF DESCRIPTION OF THE DRAWINGS

Exemplary embodiments of the invention are illustrated in the drawings and described hereafter. In the drawings.

DETAILED DESCRIPTION OF THE DRAWINGS

The devices illustrated in FIGS. 1 to 4 are designed for the cleaning of conical shank parts, but it is self-evidently possible to design the devices described for other, especially cylindrical shank parts too, without changes other than the adaptation to the particular shape of the shank part having to be made to the form of the device.

Figure 1:
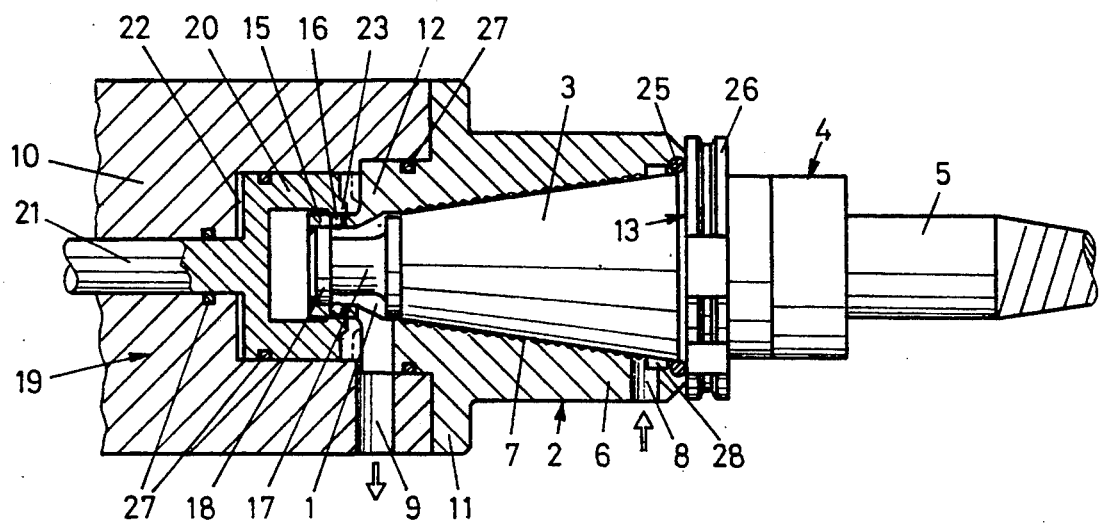
FIG. 1 shows a diagrammatically represented longitudinal section through a device for cleaning the shank part of tools or toolholders with a conical shank part.

The device according to FIG. 1 has essentially a cleaning chamber 1 which is arranged in a housing 2. Inserted in the cleaning chamber 1 is the shank part 3 of a toolholder 4, in which a tool 5, for example a milling tool, is inserted.

The cleaning chamber has a shape matched to the shape of the shank part 3, in this particular case having a conical shape corresponding to the conical shank part 3. Fashioned in the wall 6 of the housing 2 is a single or multiple internal thread 7 which extends essentially over the entire surface of the shank part 3. Since the bearing face of the shank part 4 bears against the wall 6 of the cleaning chamber 1, the thread groove or grooves of the internal thread 7 constitute the only passage of between a run-in orifice 8 and a run-off orifice 9, the run-in orifice 8 being located at the root of the shank part 3 and the run-off orifice 9 at the free end of the latter. If the internal thread 7 is omitted, a gap is provided between the shank part 3 and the wall 6 of the cleaning chamber 1.

The housing 2 with the cleaning chamber 1 is fastened to a base 10 by means of a flange 11. A cylindrical endpiece 12 adjoins the flange 11 and terminates in a cylindrical collar 15, in which radial orifices for receiving holding balls 16 are provided.

For the retention of the shank part 3, the clamping bolt 17 is provided, which is arranged at its end and has a end flange 18 and which, with the shank part 3 inserted, assumes a position in which the holding balls 16 engage behind the end flange 18.

To keep the holding balls 16 in the holding position, a sliding sleeve 20 is provided, which has a push rod 21 and which is arranged axially displaceably in a recess 22 and has a retaining collar 23, the inner edge of which is of a diameter preventing the holding balls 16 from escaping when the sliding sleeve 20 is in the holding position, so that the end flange 18 and therefore the shank part 3 cannot be removed from the cleaning chamber 1. However, when the sliding sleeve 20 is pushed into the position represented by broken lines, the holding balls 16 are located next to the retaining collar 23 and can escape outwards, so that the shank part 3 can be removed from the cleaning chamber 1.

The sliding sleeve 20 with the hold balls 16 is not absolutely necessary for the cleaning function. It is also possible to press the tool 5 or toolholder 4 into the cleaning chamber 1 manually and hold it there during the cleaning operation. If, for example, the cleaning device is provided in a tool store, the tool 5 or toolholder 4 can be inserted into the cleaning device by means of the tool changer, clamped by the sliding sleeve 20 and subsequently cleaned, until the tool is inserted into the machine spindle by the tool changer. In contrast, with the tools kept in stock in the tool space, the shank part 3 can be cleaned by pressing it down manually.

At the free end of the cleaning chamber 1, a soft sealing ring 25, for example an O-ring, is provided, which bears against the cylindrical end part of the conical shank part 3 and seals off the cleaning chamber 1 there. Fastened to the toolholder 4 or to the tool 5 is a gripping ring 26 which the gripper of the tool changer grasps for transporting the tool or toolholder to the machine spindle.

In the region of the housing 2 and of the sliding sleeve 20, further sealing rings 27 are provided, which protect the Cleaning device against losses of cleaning liquid.

To clean a shank part 3 inserted into the cleaning chamber 1, cleaning liquid is conveyed through the run-in orifice 8 into an annular channel 28, from where it flows through the grooves of the internal thread 7, thereby cleans the surface of the shank part 3 and subsequently flows off through the run-off orifice 9. A change is thereafter made to the throughflow of a gas, for example compressed air, with the result that the shank part is dried.

Figure 2:
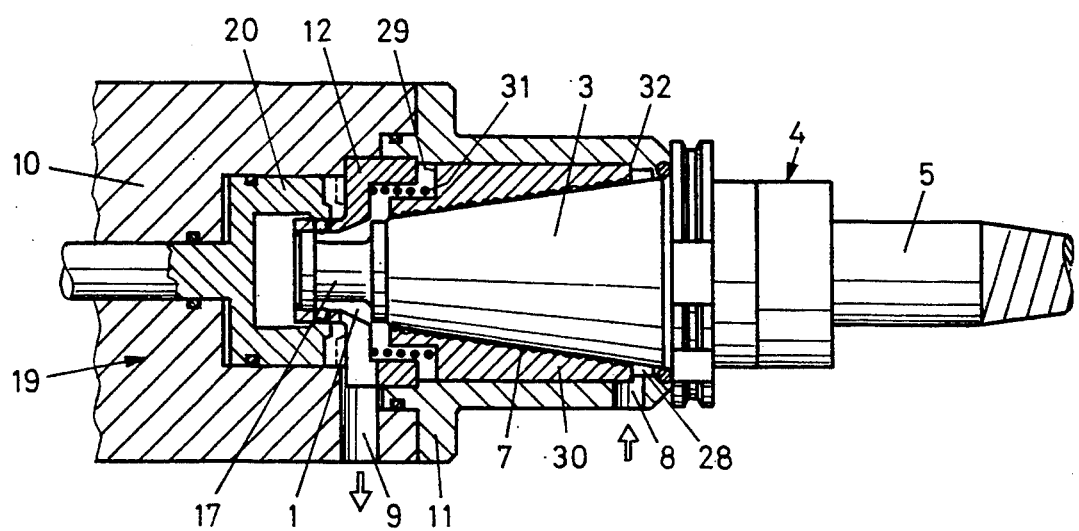
FIG. 2 shows a diagrammatically represented longitudinal section through a second embodiment of a device for cleaning the shank part of tools and toolholder.

The cleaning device according to FIG. 2 has a relatively close similarity to that according to FIG. 1. The difference is that, in the embodiment according to FIG. 2, the cleaning chamber 1 is limited by a displaceable cleaning sleeve 30. The cleaning sleeve 30 likewise possesses an internal thread 7 and is maintained by a compression spring 31 in its position of rest, shown in FIG. 2, in which it bears against one edge 32 of the annular channel 28. Now when compressed liquid is introduced into the annular channel 28 through the run-in orifice 8, a pressure on the end face is generated in the annular channel 28 because of the flow resistance of the liquid in the thread grooves of the internal thread 7, so that the cleaning sleeve 30 is displaced in the direction of the compression spring 31. The passage cross-section at the internal thread 7 is thereby increased and the pressure in the annular channel consequently reduced again. There is therefore a pulsating movement of the cleaning sleeve 30 which guarantees an improved cleaning of the surface of the shank part 3. The cleaning liquid, which has the customary cleaning and preserving additives, is not introduced into the cleaning device under constant pressure, but in a pulsating manner, the pulsation frequency advantageously being matched to the natural frequency of the cleaning device. The cleaning liquid simultaneously flows at high speed with a twist between the thread grooves and the surface of the shank part. After the cleaning liquid has flowed through along the shank part 3, it passes out virtually without pressure through the run-off orifice 9 in the vicinity of the clamping bolt 17.

Subsequently, after an appropriate valve (not shown) has been reversed, compressed air is blown through the cleaning device by way of the inlet port 5, with the result that the surface of the shank part 3 is dried, and only after the shank part 3 has been removed from the cleaning chamber 1 completely is the compressed air cut off.

Of course, the compressed-air treatment is also provided in the same way in the device according to FIG. 1, so that the shank part 3 is removed completely dry.

Figure 3:
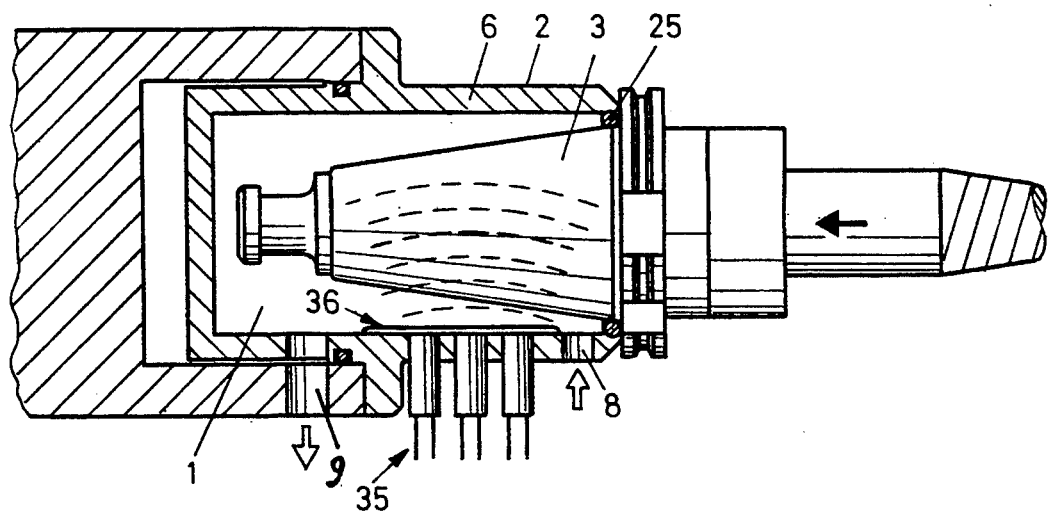
FIG. 3 shows a diagrammatically represented longitudinal section through a third embodiment of a device for cleaning the shank part of tools and toolholders, in which the cleaning effect is obtained by ultrasonics.

In the cleaning device according to FIG. 3, the cleaning chamber 1 has a cylindrical shape, irrespective of the shape of the shank part 3, so that a space with cleaning liquid is obtained between the surface of the shank part 3 and the wall 6 of the cleaning chamber 1.

Ultrasonic generators 35 are installed in the housing 2 at one or more locations and are separated from the cleaning liquid by means of a vibratory metal diaphragm 36. The cleaning liquid is set in high-frequency vibration by the ultrasonic generators 35, thus bringing about an intensive cleaning effect on the surface of the shank part 3. During the ultrasonic treatment, cleaning liquid is introduced through the run-in orifice 8 and discharged through the run-off orifice 9, with the result that the released particles are removed from the cleaning chamber 1.

In this cleaning device too, the shank part 3 can be retained and clamped in the sliding sleeve 20 by means of the clamping bolt 17.

Figure 4:
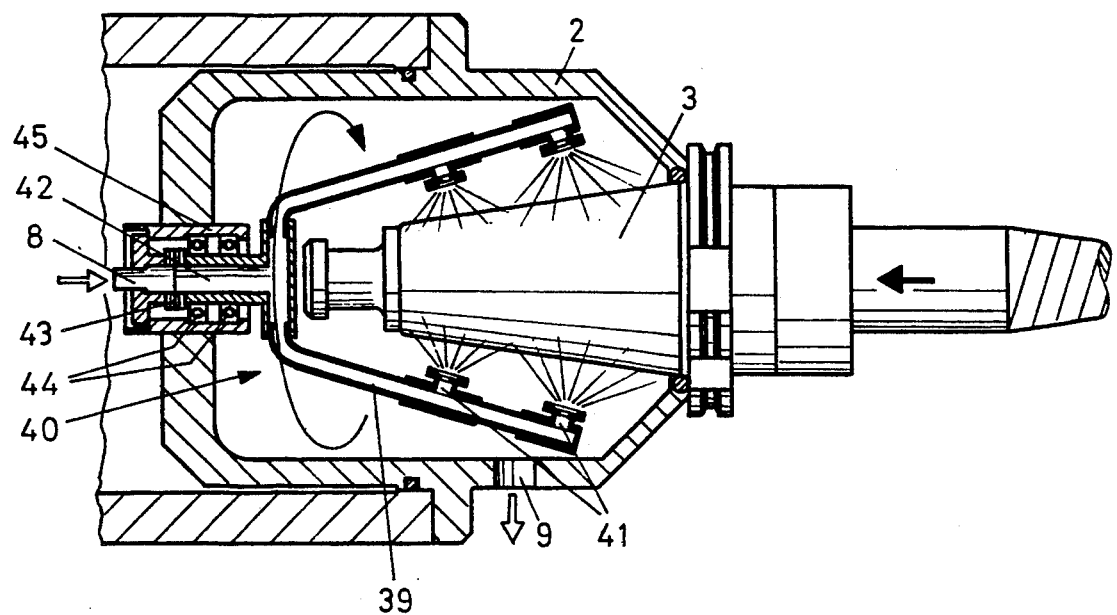
FIG. 4 shows a diagrammatically represented longitudinal section through a fourth embodiment of a device for cleaning the shank part of tools and toolholders, in which the cleaning is carried out by means of rotating high-pressure nozzles.

In the cleaning device according to FIG. 4, a cylindrical cleaning chamber 1 is once again provided in the housing 3, a free space in which a rotor 40 is mounted rotatably being obtained between the shank part 3 and the wall 6 of the cleaning chamber. The rotor 40 has at least one arm 31 which is shaped from a tube and to which high-pressure nozzles 41 are fastened. In FIG. 4, two such nozzles 41 are provided for each arm 39, but a different number of nozzles 41 can also be provided. In FIG. 4, the tool 5 or the toolholder 4 is held manually during the cleaning, but, here too, an automatic clamping of the shank part 3 can be provided. The rotor 40 is set in rotation by the jets coming slightly tangentially out of the mouths of the nozzles 41. Since the rotor has a rotating axial tube 42 and the inflow line 8 is fixed, a rotary lead-through 43 must be provided in order to allow the rotor 40 to rotate. The axial tube 42 is mounted rotatably by means of bearings 44, for example rolling bearings, which are arranged in a lead-through housing 45. The lead-through housing 45 is inserted in the wall of the housing 2 and sealed off against splashes of liquid in the usual way.

After the cleaning liquid has flowed through the high-pressure nozzles 41, it collects in the cleaning chamber 1 and leaves this through the run-off orifice 9.

When the rotor 40 which runs at high speed is to be braked, the cleaning chamber can be filled with compressed liquid by closing the run-off orifice 9 and the rotor 40 can consequently easily be braked. After the liquid cleaning, as in the other embodiments the shank part 3 is dried by the introduction of compressed air in this cleaning device too.

The cleaning devices described have the advantage of guaranteeing a highly effective liquid cleaning and gas drying. In contrast to the known devices, the transfer of impurities by the shank part is reliably prevented. The device can be set up either in the tool magazine or in the vicinity of the machine spindle, and therefore, in the latter case, there is no need for any additional empty trips to the cleaning site. Because of the efficiency of the cleaning, only a relatively small amount of cleaning liquid is also required. The cleaning devices described can be operated in a manual or automated way.

The cleaning device according to FIG. 1 involves a simple cleaning concept, yet, even with this, a good cleaning effect is achieved. If required, the cleaning cycle can be selected long enough to ensure that the desired degree of cleaning is reached.

In the embodiment according to FIG. 2, as in that according to FIG. 1, the cleaning liquid flows in a twist between the thread grooves and the surface of the shank part 3, thereby reinforcing the cleaning effect. In the cleaning device according to FIG. 3 too, a high cleaning effect is obtained. The impurities adhering to the surface of the shank part 3 are released reliably and removed from the cleaning chamber 1 by the cleaning liquid flowing through. The device is of simple construction and has no mechanical moving parts. Also, because of the small liquid volume in the cleaning chamber 1, only a relatively low ultrasonic power is required.

The cleaning device according to FIG. 4 likewise achieves an intensive cleaning effect which leads to a reliable release of any impurities on the surface of the shank part 3.

I claim:

1. Device for cleaning a shank part of a tool or of a toolholder receiving a tool, comprising:
    a housing defining a cleaning chamber, said housing being dimensioned so as to be only slightly larger than the shank part, and having a run-in orifice and a run-off orifice for an in-flow and an out-flow of a fluid through the cleaning chamber, the shank part being insertable into said housing, said cleaning chamber having a closed end and a circular open end, said open end being adapted for receiving said shank part; at least one ultrasonic generator for cleaning the shank part of the tool or of the toolholder by means of the cleaning liquid set in high-frequency vibration and flowing through the cleaning chamber is attached to a portion of a wall of the housing; and sealing means at said open end of said chamber for sealing the shank part into the cleaning chamber so that the shank part closes the open end of the cleaning chamber during cleaning.

2. Device for cleaning a shank part of a tool or tool holder receiving the tool, wherein the shank part can be clamped in a machine spindle of a machine tool, comprising
    a housing having an open-ended cleaning chamber which is slightly larger than the shank part,
    the cleaning chamber having aback wall and enclosing walls defining a circular opening for releasably receiving the shank part for cleaning, a soft seal means surrounding the opening for sealing the shank part in the opening,
    the chamber having a run-in orifice means for inflow of a cleaning fluid and an outflow orifice means for fun-off of the cleaning fluid,
    the housing containing at least one ultra-sonic generator means attached to a portion of the wall of the chamber for inducing high frequency oscillation in the cleaning fluid.

3. The device of claim 1, wherein the ultra-sonic generator is attached to one of the walls of the cleaning chamber and separated from the cleaning fluid by a vibratory metal diaphragm.

* * * * *

UNITED STATES PATENT AND TRADEMARK OFFICE
CERTIFICATE OF CORRECTION

PATENT NO. : 5,353,823
DATED : October 11, 1994
INVENTOR(S) : Peter Novak

It is certified that error appears in the above-indentified patent and that said Letters Patent is hereby corrected as shown below:

On the title page item [75] inventor, should read -- Peter Novak--.
On the tiele page, item[73] assignee, should read --Starrfräsmaschinen AG--, Signed and Sealed this Twenty-fourth Day of January, 1995

Attest:

BRUCE LEHMAN

Attesting Officer

Commissioner of Patents and Trademarks